United States Patent
Anderson

(10) Patent No.: US 6,934,394 B1
(45) Date of Patent: Aug. 23, 2005

(54) UNIVERSAL FOUR-CHANNEL SURROUND SOUND SPEAKER SYSTEM FOR MULTIMEDIA COMPUTER AUDIO SUB-SYSTEMS

(75) Inventor: Jeffrey S. Anderson, Camas, WA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 0 days.

(21) Appl. No.: 09/515,776

(22) Filed: Feb. 29, 2000

(51) Int. Cl.$^7$ ............................................. H04R 5/00
(52) U.S. Cl. ........................................ 381/19; 381/23
(58) Field of Search ............................... 381/1, 17–19, 381/21, 306–310, 123, 11, 23

(56) References Cited

U.S. PATENT DOCUMENTS

| | | | |
|---|---|---|---|
| 4,006,306 A * | 2/1977 | Driscoll | 381/3 |
| 4,612,663 A * | 9/1986 | Holbrook et al. | 381/24 |
| 4,968,154 A * | 11/1990 | Baeg | 381/18 |
| 5,841,993 A * | 11/1998 | Ho | 395/282 |
| 6,198,826 B1 * | 3/2001 | Cowieson et al. | 381/18 |

* cited by examiner

*Primary Examiner*—Duc Nguyen
*Assistant Examiner*—Lun-See Lao
(74) *Attorney, Agent, or Firm*—Ipsolon, LLP

(57) ABSTRACT

A universal four-channel multimedia computer speaker system is connectable to audio sub-system control circuits (e.g., "sound cards") of both the four-channel type and the conventional two-channel (stereo) type. With the audio sub-system control circuit being of a four-channel type, the universal four-channel audio system functions as a conventional multimedia computer four-channel surround sound audio system. With a four audio channel multimedia computer work and the audio sub-system control circuit being of a conventional two-channel (stereo) type, the universal four-channel audio system is configured to provide one pair of wide-band speakers (e.g., the front) with distinct audio playback according to respective right-front and left-front audio channels in a four or two audio channel multimedia computer work such as a game, music, etc. The universal four-channel audio system is configured to provide at the rear speakers distinct audio playback that are generated from the right-front and left-front audio channels in the four or two audio channel multimedia computer work. With respect to the rear speakers, the universal four-channel audio system includes a proxy audio signal component that provides respective right and left rear proxy audio signals to proximate the typical sound of actual right and left rear audio signals carried on a four audio channel multimedia computer work or simulated surround signals generated from conventional two channel multimedia work.

31 Claims, 3 Drawing Sheets

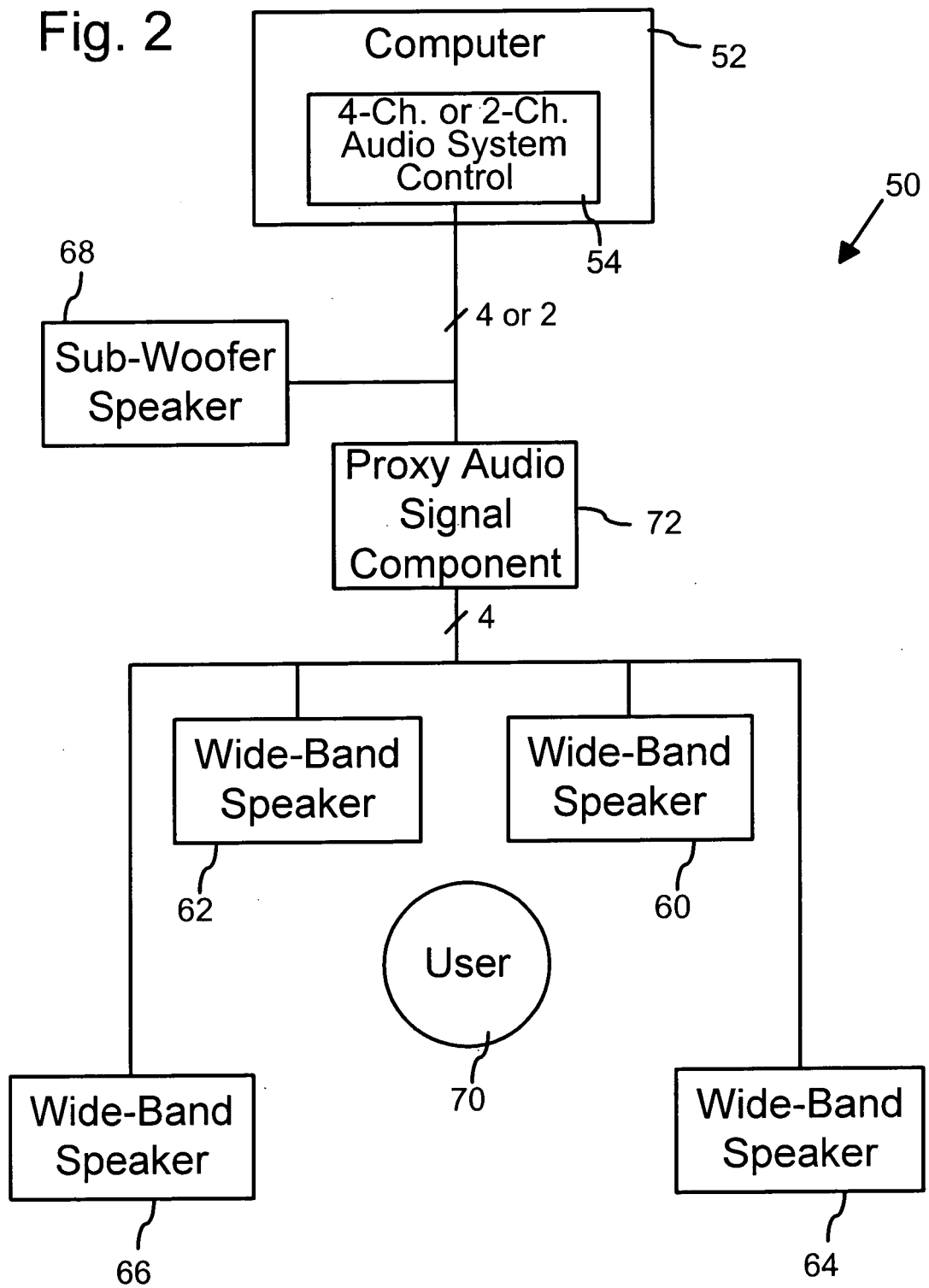

UNIVERSAL FOUR-CHANNEL SURROUND SOUND SPEAKER SYSTEM FOR MULTIMEDIA COMPUTER AUDIO SUB-SYSTEMS

FIELD OF THE INVENTION

The present invention relates to multimedia computer speaker systems connectable to audio sub-system control circuits (e.g., "sound cards") of multimedia computers and, in particular, to a universal four-channel multimedia computer speaker system that is connectable to audio sub-system control circuits of two- or four-channel types.

BACKGROUND AND SUMMARY OF THE INVENTION

Speaker systems with integral amplification electronics provide simple, compact audio transducers for multimedia personal computers. These speaker systems, referred to herein as multimedia computer speaker systems, typically include pairs of wide-band speaker drivers mounted in separate housings with amplification electronics incorporated into one or both housings. Because compactness is desirable, small, wide-band speaker drivers (e.g., 3-inch diameter cone speaker drivers) are commonly used.

Many conventional multimedia computers include two-channel (stereo) multimedia computer audio sub-systems. Typically, a conventional two-channel multimedia computer audio sub-system includes a two-channel audio sub-sub-system control circuit, which is commonly configured as a separate computer expansion board called a "sound card," and two wide-band audio transducers or speakers. A sub-woofer audio transducer or speaker is also included in many implementations. Conventional two-channel audio sub-systems are configured to provide at the two wide-band speakers distinct audio playback according to two distinct audio channels included in a multimedia computer work such as a game, music, etc.

Some multimedia computers now include four-channel multimedia computer audio sub-systems, sometimes called surround sound systems, environmental audio systems, or multi-channel audio systems. A four-channel multimedia computer audio sub-system includes a multimedia computer speaker system with four wide-band audio transducers or speakers, and typically a sub-woofer audio transducer or speaker. The four wide-band speakers receive four different audio signals or channels. The four-channel multimedia computer audio sub-system may include a two- or a four-channel audio-sub-system control circuit (e.g., sound card). Some four-channel multimedia computer audio sub-systems include four-channel audio sub-system control circuits that are adapted for multimedia computer works with four distinct audio channels. Exemplary audio sub-system control circuits of this type are promulgated as the Monster Sound™ sound cards from Diamond Multimedia Systems, Inc., the Montego II Quadzilla sound card from Voyetra Turtle Beach, Inc., and the Sound Blaster LIVE sound cards from Creative Technology Ltd. The four distinct audio signals may be referred to as right front, right rear, left front, and left rear. A subwoofer audio signal is generally a summed and low-pass filtered combination of at least two of the four distinct audio channels.

In this type of system, the wide-band speakers are positioned to surround a user of a multimedia computer with two pairs of wide-band speakers, one each in front of and behind the user. The sub-woofer generates audio outputs of such low frequencies that the user is unable to discern the direction of those sounds. As a result, the positioning of the sub-woofer is generally arbitrary.

Earlier four-channel multimedia computer audio sub-systems were of the matrix-encoded type. Simple matrix-encoded four-channel multimedia computer audio sub-systems were sometimes adapted from a conventional two-channel stereo sub-system. Front right and front left speakers would receive conventional right and left stereo audio signals. Rear right and rear left speakers both would receive a difference (e.g., Right-Left) between the two stereo signals.

A disadvantage of such a simple matrix-encoded system is that the rear speakers receive the same audio signal (e.g., Right-Left), and the audio signal is asymmetric as to the right and left stereo audio signals. This can cause a user to perceive different sounds as emanating from incongruous locations. (A user's perceptions of where sounds originate is sometimes called the sound image.)

For example, an audio signal that includes only right channel sound and no left channel sound would be played at the right front speaker and both rear speakers. These three speakers would form an audio image for the user that makes the sound seem to come from behind and to the right of the user. An audio signal that includes only left channel sound and no right channel sound would be played at the left front speaker, and the inverse of the sound would be played at both rear speakers. These three speakers would form an audio image for the user that makes the sound seem to come from behind and to the left of the user, but shifted because of the inverse left channel sounds played in the rear speakers. Such sound image incongruities are undesirable.

Another example of a four-channel multimedia computer audio sub-system is the Dolby™ surround encoding promulgated by Dolby Laboratories, Inc. This type of four-channel multimedia computer audio sub-system includes two matrix-encoded audio channels. A first channel includes a right-side audio channel, a center audio channel, and a surround audio channel. A second channel includes a left-side audio channel, the center audio channel, and the inverse of the surround audio channel. The first and second channels may be represented as:

Channel 1=Right+Center−Surround

Channel 2=Left+Center+Surround

In this type of system, Channel 1 and Channel 2 function as the right- and left-side audio channels that are applied to wide-band speakers that are positioned to the respective right and left of the user. A Center audio channel corresponds to a wide-band speaker that is positioned centrally in front of the user and is decoded as the sum of the Channel 1 and Channel 2 signals, resulting in the Center audio channel including the following audio components:

Right+Left+2Center.

A Surround audio channel corresponds to a wide-band speaker that is positioned centrally behind the user and is decoded as the difference of the Channel 1 and Channel 2 signals, resulting in the Surround audio channel including the following audio components:

Right−Left+2 Surround

A disadvantage of such systems is that the Right, Left, Center, and Surround audio channels cannot be isolated from each other. In particular, the Right or Left channels cannot be separated from the Surround or Center Channels.

Most matrixed and distinct four-channel audio sub-systems are configured to provide at the wide-band speakers audio playback according to four distinct audio channels included in a multimedia computer work such as a game, music, etc. The four distinct audio channels provide a surround sound playback with acoustic characteristics that are perceivably enhanced beyond those of traditional stereophonic playback.

A vast majority of computers include audio sub-system control circuits (e.g., "sound cards") that support only two audio channels (i.e., stereo). If a multimedia computer work having four distinct audio channels adapted to a four-channel audio sub-system is played on a conventional stereo audio sub-system control circuit, only two of the channels in the work will be played. Even if four speakers are driven by the conventional stereo audio sub-system control circuit, both right side speakers typically will play the same right-side audio signal, and both left side speakers typically will play the same left-side audio signal. Similarly, if a multimedia computer work having four matrixed audio channels (e.g., Dolby™ surround encoding) is played on a conventional stereo audio sub-system control circuit, only the two matrixed channels in the work will be played (e.g., Channel 1 and Channel 2). Even if four speakers are driven by the conventional stereo audio sub-system control circuit, both right side speakers typically will play the same right-side audio signal, and both left side speakers typically will play the same left-side audio signal. The exception to this is if the multimedia computer speaker system contains a matrix decoding circuit such as the Dolby™ Surround decoder.

Accordingly, multimedia computer works having four distinct audio channels adapted to four-channel audio sub-systems provide no audio improvement when played with conventional stereo audio sub-system control circuits. As a consequence, users having computer systems with conventional stereo audio sub-system control circuits enjoy no benefits from multimedia computer works having four distinct or matrixed audio channels, and the market for such works remains correspondingly limited.

The present invention includes a universal four-channel multimedia computer speaker system that is connectable to audio sub-system control circuits (e.g., "sound cards") of both the four-channel type and the conventional two-channel (stereo) type. The universal four-channel multimedia computer speaker system provides an actual four-channel surround sound playback whenever such playback is supported by the audio sub-system control circuit and a multimedia work with four distinct audio channels. If the audio sub-system control circuit or the multimedia work does not support four-channel surround sound playback for four distinct audio channels, the universal four-channel multimedia computer speaker system provides a proxy surround sound playback that simulates surround sound playback without suffering from incongruous sound image artifacts characteristic of some prior systems.

With the audio sub-system control circuit being of a distinct four-channel type, the universal four-channel speaker system is configured to provide at four wide-band speakers distinct audio playback according to four distinct audio channels in a four audio channel multimedia computer work such as a game, music, etc. In this configuration, the universal four-channel speaker system functions as a conventional multimedia computer four-channel surround sound audio sub-system system.

For a multimedia computer work with four distinct or matrixed audio channels, and the audio sub-system control circuit being of a conventional two-channel (stereo) type, the universal four-channel speaker system is configured to provide one pair of wide-band speakers (e.g., the front) with distinct audio playback according to respective right-front and left-front audio channels in a four audio channel multimedia computer work such as a game, music, etc. The universal four-channel speaker system is configured to provide at the rear speakers distinct audio playback that is generated from the right-front and left-front audio channels in the four audio channel multimedia computer work. With respect to the rear speakers, the universal four-channel speaker system includes a proxy audio signal component that provides respective right and left rear proxy audio signals to proximate the typical sound of actual right and left rear audio signals carried on a four audio channel multimedia computer work.

In one implementation, the proxy audio signal component generates the right and left rear proxy audio signals as inverse differences of the right-front and left-front audio channels in the four audio channel multimedia computer work. The inverse differences form the right and left rear proxy audio signals symmetrically with respect to the right-front and left-front audio channels, thereby eliminating the incongruous sound images that could arise in prior systems. The proxy audio signal component is enclosed in a housing that may or may not also enclose one of the speakers of the speaker system.

Additional objects and advantages of the present invention will be apparent from the detailed description of the preferred embodiment thereof, which proceeds with reference to the accompanying drawings.

BRIEF DESCRIPTION OF THE DRAWINGS

FIG. 2 is a simplified block diagram of a universal four-channel multimedia computer speaker system according to the present invention coupled to a computer such as a personal computer.

DETAILED DESCRIPTION OF A PREFERRED EMBODIMENT

Figure 1:
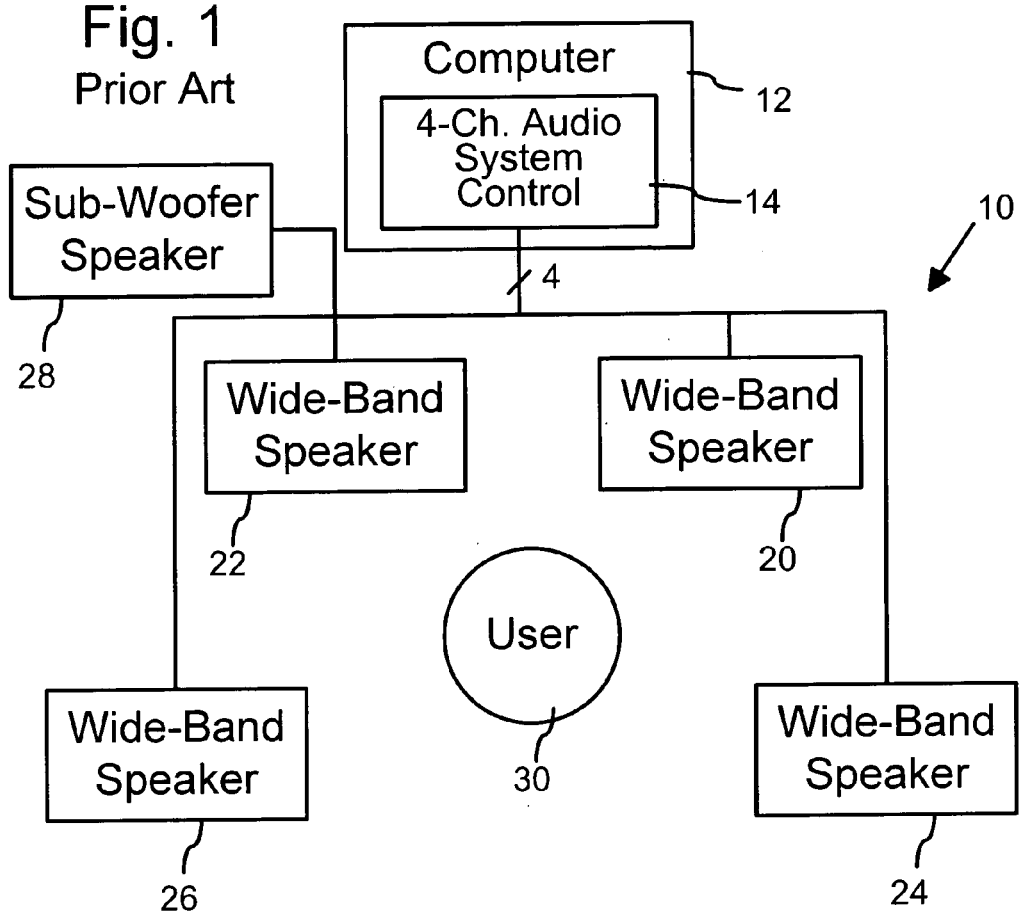
FIG. 1 is a simplified block diagram of a prior art four-channel multimedia computer audio sub-system system coupled to a computer such as a personal computer.

FIG. 1 is a simplified block diagram of a prior art four-channel multimedia computer audio sub-system 10 coupled to a computer 12 such as a personal computer and adapted for playback of multimedia works having four distinct audio channels. Four-channel computer audio sub-system 10 includes a four-channel audio sub-system control circuit 14, which is commonly configured as a separate computer expansion board called a "sound card." It will be appreciated, however, that four-channel audio sub-system control circuit 14 may alternatively be incorporated into other boards or systems.

Four-channel computer audio sub-system 10 also includes four wide-band audio transducers or speakers 20, 22, 24, and 26, and commonly a sub-woofer audio transducer or speaker 28. Typically, audio sub-system 10 includes amplifiers for speakers 20–26 and sub-woofer 28, and optionally equalizers and a bass boost system, as are known in the art. Wide-band speakers 20–26 are positioned to surround a user 30 of computer 12. For example, speakers 20 and 22 could be positioned in front of and to the respective right and left of user 30. Speakers 24 and 26 could be positioned behind and to the respective right and left of user 30. As is common in the art, sub-woofer 28 generates audio outputs of such low frequencies that user 30 is unable to discern the direction of those sounds. As a result, the positioning of sub-woofer 28 is generally arbitrary.

Four-channel audio sub-system 10 is configured to provide at speakers 20–26 distinct audio playback according to four distinct audio channels included in a multimedia computer work such as a game, music, etc. The four distinct audio channels provide a four-channel surround sound playback with acoustic characteristics that are perceivably enhanced beyond those of traditional stereophonic or quadraphonic playback.

While multimedia works with four distinct channels provide optimal performance of four-channel audio sub-system 10, it will be appreciated that a majority of multimedia computer works would typically include only two separate audio channels (i.e., stereo). When used with a conventional stereo multimedia work, four-channel audio sub-system 10 would typically default to a simplified mode of operation. In one simplified mode of operation, for example, both right speakers 20 and 24 would receive the right-side stereo audio signal, and both left speakers 22 and 26 would receive the left-side stereo audio signal.

Like multimedia computer works, a vast majority of computers include audio sub-system control circuits (e.g., "sound cards") that support only two audio channels (i.e., stereo). If a multimedia computer work having four distinct audio channels adapted to four-channel audio sub-system 10 is played on a conventional stereo audio sub-system control circuit, only two of the channels in the work will be played. Even if four speakers are driven by the conventional stereo audio sub-system control circuit, both right side speakers typically will play the same right-side audio signal, and both left side speakers typically will play the same left-side audio signal. Accordingly, multimedia computer works having four distinct audio channels adapted to four-channel audio sub-system 10 provide no audio improvement when played with a conventional stereo audio sub-system control circuit. As a consequence, users having computer systems with conventional stereo audio sub-system control circuits enjoy no benefits from multimedia computer works having four distinct audio channels, and the market for such works remains correspondingly limited.

FIG. 2 is a simplified block diagram of a universal four-channel multimedia computer speaker system 50 according to the present invention coupled to a computer 52 such as a personal computer. Four-channel computer speaker system 50 is connected to an audio sub-system control circuit 54, which is commonly configured as a separate computer expansion board called a "sound card." It will be appreciated, however, that audio sub-system control circuit 54 may alternatively be incorporated into other boards or systems within computer 52. Audio sub-system control circuit 54 may be either of a conventional two-channel (stereo) type or a four-channel type, as described below in greater detail.

Universal four-channel computer speaker system 50 includes four wide-band audio transducers or speakers 60, 62, 64, and 66, and commonly a sub-woofer audio transducer or speaker 68. Wide-band speakers 60–66 are typically positioned to surround a user 70 of computer 52. For example, speakers 60 and 62 could be positioned in front of and to the respective right and left of user 70. Speakers 64 and 66 could be positioned behind and to the respective right and left of user 70. As is common in the art, sub-woofer 68 generates audio outputs of such low frequencies that user 70 is unable to discern the direction of those sounds. As a result, the positioning of sub-woofer 68 is generally arbitrary. Speaker system 50 includes amplifiers for speakers 60–66 and sub-woofer 68, and optionally equalizers and a bass boost system, as are known in the art.

Audio sub-system control circuit 54 may be either of a distinct four-channel type, such as audio sub-system control circuit 14, or a conventional two-channel (stereo) type. With audio sub-system control circuit 54 of a distinct four-channel type, universal four-channel speaker system 50 is configured to provide at speakers 60–66 distinct audio playback according to four distinct audio channels in a four audio channel multimedia computer work such as a game, music, etc., as described above with reference to four-channel audio sub-system 10. In addition, universal four-channel speaker system 50 delivers a bass or sub-woofer audio signal to sub-woofer 68. In this configuration, universal four-channel speaker system 50 functions as a conventional four distinct channel multimedia computer surround sound audio system.

With audio sub-system control circuit 54 of a conventional two-channel (stereo) type, universal four-channel speaker system 50 is configured to provide at front speakers 60 and 62 distinct audio playback according to respective right-front and left-front audio channels in a four audio channel multimedia computer work such as a game, music, etc. or distinct audio playback according to respective right and left audio channels in a standard two-channel (stereo) audio multimedia computer work such as a game, music, etc. Universal four-channel speaker system 50 is configured to provide at rear speakers 64 and 66 distinct audio playback that is generated from the right-front and left-front audio channels in the four audio channel multimedia computer work or distinct audio playback that is generated from the right and left audio channels in the standard two-channel (stereo) multimedia computer work. In addition, universal four-channel speaker system 50 delivers a bass or sub-woofer audio signal to sub-woofer 68.

With audio sub-system control circuit 54 of a conventional two-channel (stereo) type, universal four-channel speaker system 50 operates with respect to front speakers 60 and 62 in the manner described above with reference to four-channel audio sub-system 10 for multimedia computer works with four distinct audio channels. With respect to rear speakers 64 and 66, universal four-channel speaker system 50 includes a proxy audio signal component 72 that provides respective right and left rear proxy audio signals to proximate the typical sound of actual right and left rear audio signals carried on a four audio channel multimedia computer work or simulated surround sound generated from conventional or matrix encoded two-channel (stereo) multimedia computer work.

Figure 3:
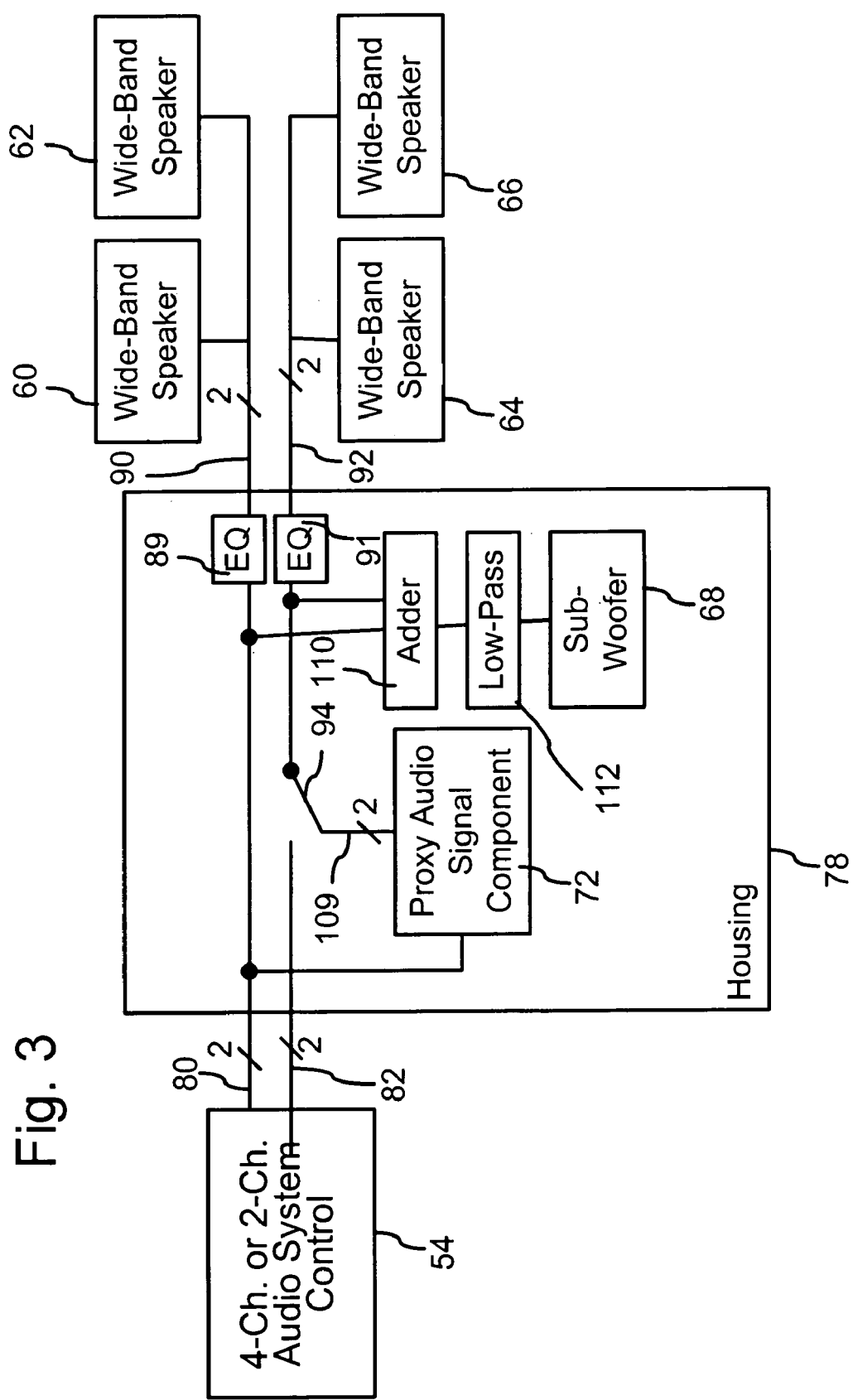
FIG. 3 is a block diagram of one implementation of a housing enclosing proxy audio signal component.

FIG. 3 is a block diagram of one implementation of a housing 78 enclosing proxy audio signal component 72. A two-channel input 80 is connectable to audio sub-system control circuit 54 to receive a first pair of right- and left-side audio signals, and a two-channel input 82 is connectable to audio sub-system control circuit 54 to receive a second pair of right- and left-side audio signals, if applicable. Input 80 is connected through an optional equalization filter 89 to a two-channel output 90 that is connectable to speakers 60 and 62, and input 82 is connected through an optional equalization filter 91 to a two-channel output 92 that is connectable to speakers 64 and 66. Optional equalization filters 89 and 91 are for correcting deficiencies in the acoustic drivers of wide-band speakers 60–66.

Connections between audio sub-system control circuit 54 and inputs 80 and 82 and between outputs 90 and 92 and speakers 60–66 are made, for example, with conventional multimedia computer audio cables. The two channels of each of inputs 80 and 82 and outputs 90 and 92 may be in any form, whether as integrated single connector units or as separate pairs of connector units.

With audio sub-system control circuit 54 of a conventional two-channel (stereo) type, the first pair of left- and right-side audio signals delivered to two-channel input 80 corresponds to the conventional right- and left-side (stereo) audio signals provided by audio sub-system control circuit 54. With such a two-channel audio sub-system control circuit 54, there is no connection between audio sub-system control circuit 54 and two-channel input 82.

With audio sub-system control circuit 54 of a four-channel type, the first pair of left- and right-side audio signals delivered to two-channel input 80 corresponds to the front right- and left-side audio signals provided by audio sub-system control circuit 54. The second pair of left- and right-side audio signals delivered to two-channel input 82 corresponds to the rear right- and left-side audio signals provided by audio sub-system control circuit 54.

The first pair of left- and right-side audio signals delivered to two-channel input 80 are also delivered to proxy audio signal component 72. Two-channel input 82 includes a switch 94 that is automatically engaged whenever a coupling is made between audio sub-system control circuit 54 and two-channel input 82. In one implementation, switch 94 is mechanically coupled to input 82 so that coupling an audio cable to input 82 engages switch 94. For example, switch 94 could provide a connection between proxy audio signal component 72 and output 92 in the absence of an audio cable being coupled to input 82, thereby delivering to output 92 the proxy audio signals generated by proxy audio signal component 72. An audio cable being coupled to input 82 switches switch 80 to provide a connection between input 82 and output 92, thereby breaking the connection between proxy audio signal component 72 and output 92. It will be appreciated that this implementation of switch 94 is merely exemplary and that the switching between the two-channel and four-channel operations could be performed in a wide variety of ways.

With audio sub-system control circuit 54 of a four-channel type, the two pairs of audio signals delivered to two-channel inputs 80 and 82 are delivered to respective two-channel outputs 90 and 92. With the coupling to input 82, switch 94 couples input 82 and output 92 and proxy audio signal component 72 is bypassed or disengaged. With audio sub-system control circuit 54 of a conventional two-channel (stereo) type, the pair of audio signals delivered to two-channel input 80 are delivered to two-channel output 90. In the absence of a coupling to input 82, switch 94 couples output 92 and proxy audio signal component 72, and input 82 is disconnected from output 92.

Proxy audio signal component 72 generates a pair of rear proxy audio signals from the pair of stereo audio signals delivered to input 80. The pair of rear proxy audio signals are delivered to two-channel output 92 to proximate the typical sound of actual right and left rear audio signals carried on a four audio channel multimedia computer work. In one implementation, proxy audio signal component 72 generates right and left rear proxy audio signals ($R'_{REAR}$, $L'_{REAR}$) as inverted differences between the right and left stereo audio signals ($R_{STEREO}$, $L_{STEREO}$) delivered to two-channel input 80. For example, the right and left rear proxy audio signals ($R'_{REAR}$, $L'_{REAR}$) may be generated according to the following equations:

$$R'_{REAR} = R_{STEREO} - L_{STEREO}$$

$$L'_{REAR} = L_{STEREO} - R_{STEREO}$$

The right and left rear proxy audio signals ($R'_{REAR}$, $L'_{REAR}$) are applied to two-channel output 92 to be delivered to respective rear speakers 64 and 66.

Figure 4:
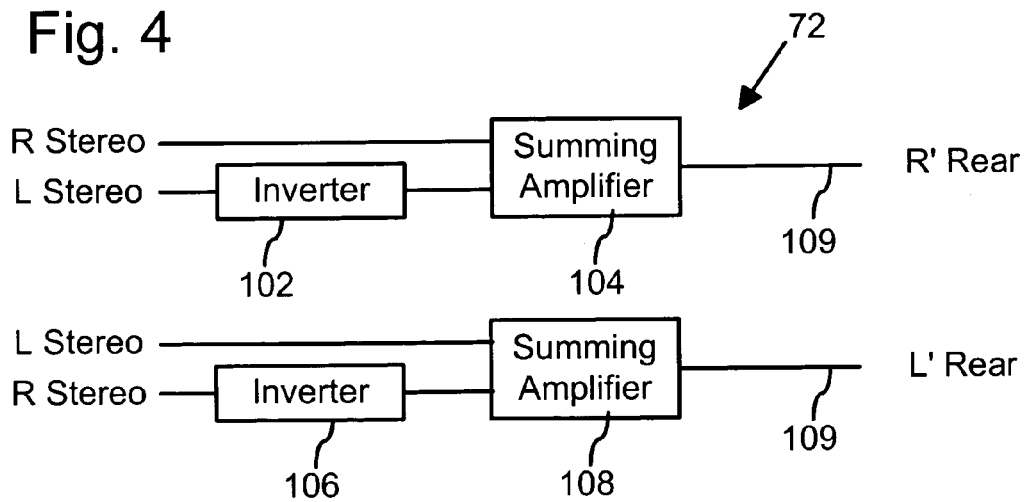
FIG. 4 is a circuit block diagram of one implementation of a proxy audio signal component.

FIG. 4 is a circuit block diagram of one implementation of proxy audio signal component 72 that includes separate circuitry for generating each of the right and left rear proxy audio signals ($R'_{REAR}$, $L'_{REAR}$). In this implementation, proxy audio signal component 72 includes an analog inverter 102, which receives and inverts the left side stereo audio signal, and an analog summing amplifier 104 that sums the right side stereo audio signal with the inverted left side stereo audio signal to provide the right rear proxy audio signal ($R'_{REAR}$). Similarly, an analog inverter 106 receives and inverts the right side stereo audio signal, and an analog summing amplifier 108 sums the left side stereo audio signal with the inverted right side stereo audio signal to provide the left rear proxy audio signal ($L'_{REAR}$). Summing amplifiers 104 and 108 deliver the summed signals to a two-channel output 109 that is coupled to output 92.

It will be appreciated, however, that various other circuitry could be employed for generating each of the right and left rear proxy audio signals ($R'_{REAR}$, $L'_{REAR}$). For example, the right rear proxy audio signal ($R'_{REAR}$) could be generated by analog inverter 102 and analog summing amplifier 104, as described above, while the left rear proxy audio signal ($L'_{REAR}$) could be generated as the inverse of the right rear proxy audio signal ($R'_{REAR}$).

It will be appreciated that additional signal processing can be made to the proxy signals to enhance the acoustic effect. For example, a band-pass filter can be applied to provide equalization that rolls off the high and low frequencies. With regard to this bandpass filter, this enhances the proxy audio signals because the high and low audio components can confuse the ear in localization, while the middle and upper middle audio components tend to be the best for localization cues.

As described above, universal four-channel computer speaker system 50 supports audio sub-system control circuits 54 of two- and four-channel types. In addition, universal four-channel computer speaker system 50 provides proximate surround sound playback of four-channel matrixed multimedia works, such as those employing Dolby™ surround encoding promulgated by Dolby Laboratories, Inc. played, for example, with audio sub-system control circuit 54 of the two-channel type.

This type of four-channel multimedia computer audio system includes two matrix-encoded audio channels. A first channel includes a right-side audio channel, a center audio channel, and a surround audio channel. A second channel includes a left-side audio channel, the center audio channel, and the surround audio channel. The first and second channels may be represented as:

Channel 1=Right+Center−Surround

Channel 2=Left+Center+Surround

With Channel 1 and Channel 2 provided as outputs of two-channel audio sub-system control circuit 54, universal four-channel computer speaker system 50 applies Channel 1 and Channel 2 to wide-band speakers 60 and 62, respectively. Proxy audio signal component forms inverse differences and applies to wide-band speakers 64 and 66 respective audio signals represented as:

Channel 1−Channel 2=Right−Left−2 Surround

Channel 2−Channel 1=Left−Right+2 Surround

These rear-channel audio signals proximate the Surround channel characteristic of Dolby™ surround encoding, but further include a symmetric application of Right and Left audio components that is not provided by Dolby™ surround encoding.

Universal four-channel computer speaker system 50 also provides proximate surround sound playback of conventional two-channel multimedia works, such as conventional stereo music recordings that are played audio sub-system control circuit 54 of the two-channel type. Table 1 below summarizes the operation of universal four-channel computer speaker system 50 with different combinations of media and audio sub-system control circuits 54. Within Table 1, R, RF, and RR refer to right, right front, and right rear audio components, and L, LF, and LR refer to left, left front, and left rear audio components. Two entries include a (*) notation, which refer to an optional implementation that is explained below.

TABLE 1

| Sound Card | Media | Sound Card Output | | | | Speaker Output | | | |
|---|---|---|---|---|---|---|---|---|---|
| | | Front | | Rear | | Front | | Rear | |
| 2 Channel | 2 Chan | R | L | | | R | L | R-L | L-R |
| | 4 Chan Discrete | RF | LF | | | RF | LF | RF-LF | LF-RF |
| | 4 Chan Matrix | Ch1 | Ch2 | | | Ch1 | Ch2 | Ch1-Ch2 | Ch2-Ch1 |
| 4 Channel | 2 Chan | R | L | | | R | L | R-L (*) | L-R (*) |
| | 4 Chan Discrete | RF | LF | RR | LR | RF | LF | RR | LR |
| | 4 Chan Matrix | Ch1 | Ch2 | | | Ch1 | Ch2 | Ch1-Ch2 (*) | Ch2-Ch1 (*) |

Universal four-channel multimedia computer speaker system 50 is described above as including a switch 94 that is automatically engaged whenever a coupling is made between audio sub-system control circuit 54 and two-channel input 82. It will be appreciated, however, that switch 94 could alternatively be implemented as a user-operable switch that is manually operated by the user rather than being automatically engaged whenever a coupling is made between audio sub-system control circuit 54 and two-channel input 82. In yet another implementation, switch 94 could be automatically engaged as described above, and universal four-channel multimedia computer speaker system 50 could further include a user-operable switch that is manually operated by the user. Such a user-operable switch could allow the user to manually engage or disengage proxy audio signal component 72 independently of the operation of switch 94. Alternative switch 94 or an additional user-operable switch would allow a user to selectively implement proximate surround sound playback indicated by the notations (*) in Table 1.

In the implementation of FIG. 3, universal four-channel multimedia computer speaker system 50 may be connected to an audio sub-system control circuit 54 of either four-channel or two-channel type and provide actual or proxy surround sound performance. Universal four-channel multimedia computer speaker system 50 provides automatic switching between operation for a two- or four-channel audio sub-system control circuit 54. As a result, universal four-channel multimedia computer speaker system 50 may be universally connected to and provide actual or proxy surround sound performance to audio sub-system control circuits 54.

Housing 78 supports inputs 80 and 82 and outputs 90 and 92 and encloses proxy audio signal component 72, as well as amplifiers and any other circuitry for the system speakers. In the illustration of FIG. 3, housing 78 also encloses sub-woofer 68 and circuitry for generating the sub-woofer or bass audio signal to be applied to sub-woofer 68. In one implementation, the right and left audio signals received at two-channel input 80 are added together or mixed by an analog adder circuit 110. A low-pass filter block 112 filters the signal from analog adder circuit 110, blocking treble frequencies while permitting the bass frequencies of the signal to pass to a bass amplifier (not shown) and to sub-woofer 68.

It will be appreciated that a housing other than the one for sub-woofer 68 may be used to support inputs 80 and 82 and outputs 90 and 92 and to enclose proxy audio signal component 72 and circuitry for sub-woofer 68. For example, inputs 80 and 82 and outputs 90 and 92 could be supported by, and proxy audio signal component 72 and circuitry for sub-woofer 68 could be enclosed by, the housing for any of speakers 60–66 or by a housing separate from any of speakers 60–68. In this instance, the housing would also typically include an output (not shown) for the subwoofer audio signal. In one implementation, inputs 80 and 82 and outputs 90 and 92 could be supported by, and proxy audio signal component 72 and circuitry for sub-woofer 68 could be enclosed by, a housing adapted to be placed on a user's desktop for convenient access or manipulation.

Having described and illustrated the principles of our invention with reference to a preferred embodiment thereof, it will be apparent that the invention can be modified in arrangement and detail without departing from such principles. In view of the many possible embodiments to which the principles may be put, it should be recognized that the detailed embodiment is illustrative only and should not be taken as limiting the scope of our invention. Accordingly, we claim as our invention all such modifications as may come within the scope and spirit of the following claims and equivalents thereto.

What is claimed is:

1. A universal four-channel multimedia computer speaker system connectable to an audio sub-system control circuit of a multimedia computer, comprising:
   four separately positionable audio speakers;
   two pairs of inputs for receiving from the audio sub-system control circuit at least a first one of two pairs of audio input signals;
   outputs for delivering distinct audio output signals to each of the four audio speakers, a first pair of the audio speakers receiving audio output signals corresponding to the first one of two pairs of audio signals; and
   a proxy audio signal component coupled to the outputs to provide to a second pair of the audio speakers a pair of distinct proxy audio output signals whenever the inputs receive only the first one of two pairs of audio input signals.

2. The computer speaker system of claim 1 in which the second pair of the audio speakers receive audio output signals corresponding to the second one of the two pairs of audio input signals whenever the inputs receive both the first and second pairs of audio input signals.

3. The computer speaker system of claim 1 further comprising a housing that supports the inputs and outputs and encloses the proxy audio signal component.

4. The computer speaker system of claim 3 in which the housing further encloses one of the four audio speakers.

5. The computer speaker system of claim 3 in which the housing further encloses none of the audio speakers of the computer speaker system.

6. The computer speaker system of claim 1 further comprising a sub-woofer speaker that is within a sub-woofer housing and receives a sub-woofer audio signal, the sub-woofer housing supporting the inputs and outputs and enclosing the proxy audio signal component.

7. The computer speaker system of claim 1 in which the pair of distinct proxy audio output signals are generated from the first one of two pairs of audio input signals.

8. The computer speaker system of claim 7 in which the pair of distinct proxy audio output signals include inverse differences of the first one of two pairs of audio input signals.

9. The computer speaker system of claim 7 in which the first one of two pairs of audio input signals includes a right front audio signal RSTEREO and a left front audio signal LSTEREO and the pair of distinct proxy audio output signals includes a right rear audio signal R'REAR and a left rear audio signal L'REAR, wherein the proxy audio output signals correspond to the right and left front audio signals as follows:

R'REAR=RSTEREO−LSTEREO

L'REAR=LSTEREO−RSTEREO.

10. The computer speaker system of claim 1 further comprising a bandpass filter that bandpass filters the pair of distinct proxy audio output signals.

11. A four-channel multimedia computer speaker system, comprising:
    four inputs connectable to receive four distinct audio input signals from an audio sub-system control circuit of a multimedia computer;
    four outputs connectable to four separately positionable audio speakers;
    couplings between a first pair of the inputs and a first pair of the outputs to deliver to the first pair of outputs audio input signals received at the first pair of inputs;
    a proxy audio signal component selectively coupled to a second pair of the outputs to provide thereto a pair of distinct proxy audio output signals that are generated from the audio input signals received at the first pair of inputs; and
    a switch element that selectively couples the proxy audio signal component to the second pair of outputs whenever audio input signals are received at only the first pair of inputs.

12. The computer speaker system of claim 11 in which the switch element is manually operable by a user.

13. The computer speaker system of claim 11 in which the switch element is operates automatically according to which inputs are connected to receive audio input signals from an audio sub-system control circuit.

14. The computer speaker system of claim 11 further comprising a housing that supports the inputs and outputs and encloses the proxy audio signal component.

15. The computer speaker system of claim 14 in which the housing further encloses one of the four audio speakers.

16. The computer speaker system of claim 14 in which the housing further encloses none of the audio speakers of the computer speaker system.

17. The computer speaker system of claim 11 further comprising a sub-woofer speaker that is within a sub-woofer housing and receives a sub-woofer audio signal, the sub-woofer housing supporting the inputs and outputs and enclosing the proxy audio signal component.

18. The computer speaker system of claim 11 in which the pair of distinct proxy audio output signals are generated from a first two of the four audio input signals.

19. The computer speaker system of claim 18 in which the pair of distinct proxy audio output signals include inverse differences of the first two of the four audio input signals.

20. The computer speaker system of claim 18 in which the first two of the four audio input signals include a right front audio signal RSTEREO and a left front audio signal LSTEREO and the pair of distinct proxy audio output signals includes a right rear audio signal R'REAR and a left rear audio signal L'REAR, wherein the proxy audio output signals correspond to the right and left front audio signals as follows:

R'REAR=RSTEREO−LSTEREO

L'REAR=LSTEREO−RSTEREO.

21. The computer speaker system of claim 11 further comprising a bandpass filter that bandpass filters the pair of distinct proxy audio output signals.

22. A four-channel multimedia computer speaker system, comprising:
    four inputs connectable to receive four distinct audio input signals from an audio sub-system control circuit of a multimedia computer;
    outputs connectable to four separately positionable audio speakers;
    couplings between a first pair of the inputs and a first pair of the outputs to deliver to the first pair of outputs audio input signals received at the first pair of inputs;
    a proxy audio signal component selectively coupled to a second pair of the outputs to provide thereto a pair of distinct proxy audio output signals that are generated from the audio input signals received at the first pair of inputs; and
    a first two of the four audio input signals including a right front audio signal RSTEREO and a left front audio signal LSTEREO and the pair of distinct proxy audio output signals including a right rear audio signal R'REAR and a left rear audio signal L'REAR, wherein the proxy audio output signals correspond to the right and left front audio signals as follows:

$$R'REAR = RSTEREO - LSTEREO$$

$$L'REAR = LSTEREO - RSTEREO,$$

whenever audio input signals are received at only two of the four inputs.

23. The computer speaker system of claim 22 further comprising a switch element that selectively couples the proxy audio signal component to the outputs.

24. The computer speaker system of claim 22 in which the switch element is manually operable by a user.

25. The computer speaker system of claim 22 in which the switch element is operates automatically according to which inputs are connected to receive audio input signals from an audio sub-system control circuit.

26. The computer speaker system of claim 22 further comprising a housing that supports the inputs and outputs and encloses the proxy audio signal component.

27. The computer speaker system of claim 26 in which the housing further encloses one of the four audio speakers.

28. The computer speaker system of claim 26 in which the housing further encloses none of the audio speakers of the computer speaker system.

29. The computer speaker system of claim 22 further comprising a sub-woofer speaker that is within a sub-woofer housing and receives a sub-woofer audio signal, the sub-woofer housing supporting the inputs and outputs and enclosing the proxy audio signal component.

30. The computer speaker system of claim 22 in which the pair of distinct proxy audio output signals are generated from a first two of the four audio input signals.

31. The computer speaker system of claim 30 in which the pair of distinct proxy audio output signals include inverse differences of the first two of the four audio input signals.

* * * * *